US008045483B1

(12) United States Patent
Lo et al.

(10) Patent No.: US 8,045,483 B1
(45) Date of Patent: *Oct. 25, 2011

(54) METHODS AND APPARATUS FOR PERFORMING REVERSE AUTO-NEGOTIATION IN NETWORK COMMUNICATION

(75) Inventors: William Lo, Cupertino, CA (US); Francis Campana, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 64 days.

This patent is subject to a terminal disclaimer.

(21) Appl. No.: 12/573,498

(22) Filed: Oct. 5, 2009

Related U.S. Application Data

(62) Division of application No. 10/850,239, filed on May 19, 2004, now Pat. No. 7,616,587.

(60) Provisional application No. 60/561,967, filed on Apr. 14, 2004.

(51) Int. Cl.
*H04L 12/28* (2006.01)
(52) U.S. Cl. .................................. 370/254
(58) Field of Classification Search .......... 370/254, 370/463, 252, 286, 360, 389, 392, 395; 713/320
See application file for complete search history.

(56) References Cited

U.S. PATENT DOCUMENTS

| 5,859,979 | A | 1/1999 | Tung et al. |
| 6,285,673 | B1 | 9/2001 | Blackburn et al. |
| 6,912,209 | B1 | 6/2005 | Thi et al. |
| 6,917,594 | B2* | 7/2005 | Feuerstraeter et al. ...... 370/244 |
| 7,161,911 | B1 | 1/2007 | Fang et al. |
| 7,203,851 | B1 | 4/2007 | Lo et al. |
| 2002/0041571 | A1* | 4/2002 | Huff .............................. 370/252 |
| 2003/0126486 | A1* | 7/2003 | Bui ............................... 713/320 |
| 2004/0196849 | A1 | 10/2004 | Aksu et al. |
| 2005/0129052 | A1* | 6/2005 | Hurwitz et al. ............... 370/445 |
| 2006/0184813 | A1* | 8/2006 | Bui ............................... 713/320 |

OTHER PUBLICATIONS

IEEE Computer Society, *IEEE Standards 802.3* (™), The Institute of Electrical and Electronic Engineers, Inc., New York, NY, 2002, subsections 28 and 40.

* cited by examiner

*Primary Examiner* — Hassan Phillips
*Assistant Examiner* — Prenell Jones

(57) ABSTRACT

The present invention relates to methods and apparatus for performing reverse auto-negotiation, in which one network device establishes a link with another network device at a preferred operating mode (e.g., the lowest speed) common to both devices without linking twice. The physical layer of a local network device (local PHY) may stall the normal auto-negotiation process with the link partner, while receiving the abilities of the link partner. The local PHY may then transmit a signal having only the preferred common operating mode (e.g., the lowest speed) encoded within. The link partner may then conclude that the local PHY is only capable of the preferred common operating mode (e.g., the lowest speed) and a link between the two devices may be established at that common mode.

21 Claims, 6 Drawing Sheets

METHODS AND APPARATUS FOR PERFORMING REVERSE AUTO-NEGOTIATION IN NETWORK COMMUNICATION

This application is a divisional of U.S. patent application Ser. No. 10/850,239, filed May 19, 2004, which claims the benefit of U.S. Provisional Application No. 60/561,967, filed Apr. 4, 2004, which are hereby incorporated by reference herein in their entirety.

BACKGROUND OF THE INVENTION

This invention relates to protocols for determining a common mode of operation for two network devices that can operate at multiple modes. More particularly, this invention relates to methods and apparatus for performing reverse auto-negotiation between the two network devices.

A local area network may be provided to establish a network connection between a plurality of network devices (e.g., computers, printers, routers, switches, hubs, etc.). These network devices, however, may each have different networking abilities (e.g., speed, duplex, pause, master/slave, etc.). For example, one device (e.g., a hub) may support 10BASE-T and 1000BASE-T connections. Another device (e.g., a computer) may support 10BASE-T, 100BASE-T, and 1000BASE-T connections. The network standard (e.g., IEEE 802.3) may define a protocol, such as an auto-negotiation protocol, to determine the highest common mode (e.g., the highest speed) at which these devices can operate to communicate with one another. In this example, auto-negotiation may determine that the highest common operational mode of the two network devices is 1000BASE-T.

A network device operating at 1000BASE-T, however, consumes a large amount of power compared to, for example, a 10BASE-T connection. In particular, a network device operating at 1000BASE-T must use four data transceivers to transmit and receive data packets over four twisted-pair cable paths. On the other hand, a network device operating at 10BASE-T and 100BASE-T only requires a single data transceiver to transmit and receive data packets over two twisted-pair cable paths.

Therefore, for purposes of reducing power consumption, it may not be desirable for some network devices to operate at the highest common operational mode. Instead, a different mode may be preferred. For example, if a local network device maintains a constant link with another network device (e.g., a server for periodic backup of data), it may not be desirable to sustain a constant high speed connection (e.g., 1000BASE-T), especially when the local network device is idle for long periods of time (e.g., overnight). In this example, it may be desirable for the local network device to operate at the lowest common operational mode (e.g., 10BASE-T) in order to reduce power consumption for the local network device.

One approach to establishing a connection between a local network device and another network device (i.e., the link partner) at any common mode is for the local network device to determine the abilities of the link partner through normal auto-negotiation. Then the local network device may intentionally break the link with the link partner and re-link with the link partner. When auto-negotiation occurs for the second time, the local network device advertises only the common mode at which it prefers to operate (e.g., the lowest speed at which the link partner is able to operate). The link partner receives only this advertised capability, and the local network device and the link partner connect at the preferred common operational mode.

Although this approach results in the desired outcome (e.g., the two network devices link at the preferred mode), this approach has several disadvantages for the overall network. One of these disadvantages is that the two network devices must link twice before establishing a connection. Every time a link is broken and reestablished, the network must recalculate its spanning tree. Recalculating a network spanning tree involves remapping a single path to each network device to prevent the same packet from arriving at a network device multiple times. If several devices unnecessarily force the network to recalculate its spanning tree, the network may experience a slowdown in traffic for other network devices.

SUMMARY OF THE INVENTION

It is therefore an object of the present invention to allow two network devices to communicate at a preferred common mode other than the highest common mode determined by normal auto-negotiation without having to link twice.

This and other objects of the present invention are accomplished in accordance with the principles of this invention by providing methods and apparatus for performing reverse auto-negotiation.

Reverse auto-negotiation may be performed in accordance with the invention by allowing a local network device to stall the process of auto-negotiation with another network device (i.e., the link partner). This allows the local network device to receive the abilities of the link partner before advertising its own abilities in a way that would allow the link partner to make a communication protocol selection based on normal auto-negotiation criteria. Once the local network device receives the abilities of the link partner, the local network device advertises to the link partner that it is only able to operate at a single mode (i.e., the preferred common operational mode).

The physical layer of the local network device (local PHY) may stall the link partner by transmitting a series of fast link pulse (FLP) bursts, in which at least one or, more preferably, several bits of consecutive FLP bursts (other than the speed/duplex and acknowledge bits) are toggled. The link partner will not progress to the next phase of the auto-negotiation process until, for example, three consecutive matching FLP bursts (excluding the acknowledge bit) are received.

While the link partner continues to wait for three matching FLP bursts from the local PHY, the local PHY may receive FLP bursts from the link partner, in which the abilities of the link partner are encoded. If the local PHY receives, for example, three FLP bursts having consistent speed and duplex bits, then the local PHY may assume that the abilities of the link partner are accurately encoded in its FLP bursts.

The local PHY may determine the communication capabilities of the link partner based on the received FLP bursts. Using a modified priority resolution function (e.g., in which the preferred operational mode has the highest priority), the local PHY may determine the highest priority mode that is common to both of the PHYs. In some embodiments, the highest priority mode may be the slowest mode (e.g., 10BASE-T). As another example, the highest priority mode may be the mode that consumes the least amount of power.

The local PHY may continue with the normal auto-negotiation process by advertising only the preferred common operational mode to the link partner. Upon the resolution of auto-negotiation, the local PHY and the link partner may establish a link, in which both the local PHY and the link partner operate at the preferred common mode.

An example of a context in which the invention can be implemented is in an Ethernet transceiver.

Further features of the invention, its nature and various advantages will be more apparent from the accompanying drawings and the following detailed description of the preferred embodiments.

DETAILED DESCRIPTION OF THE PREFERRED EMBODIMENTS

For purposes of illustration and not limitation, the present invention will be described in connection with an IEEE-802.3-compliant local area network (LAN). It should be noted that the principles of the present invention are applicable to any protocol that governs communication between electronic devices.

Figure 1:
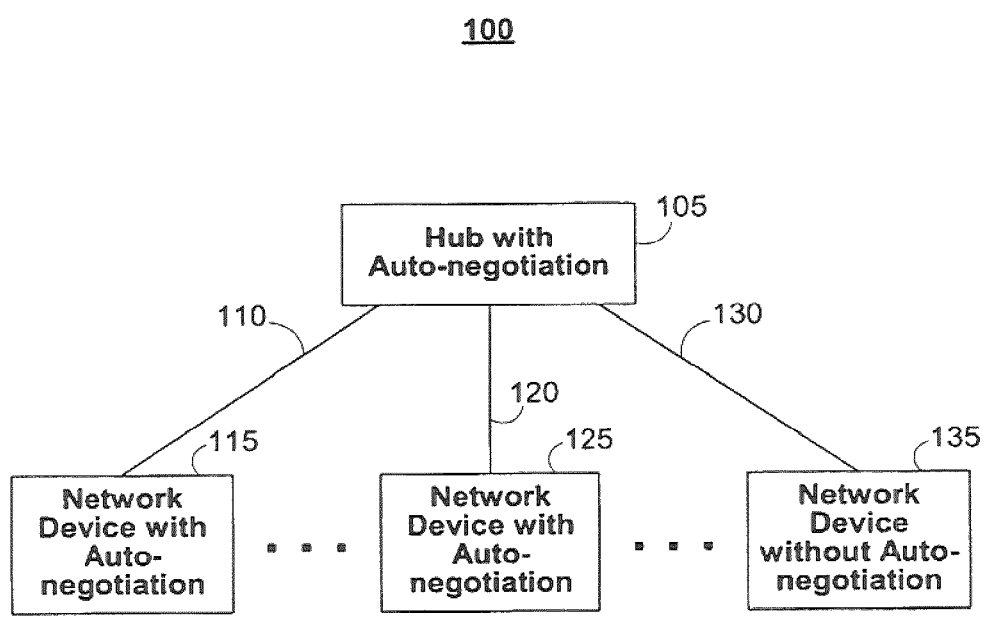
FIG. 1 is a simplified schematic block diagram of an illustrative computer network in accordance with the present invention that supports auto-negotiation and reverse auto-negotiation.

An illustrative computer network 100 that supports auto-negotiation and reverse auto-negotiation is shown in FIG. 1. Components of network 100 may include hub 105 and network devices 115, 125, and 135. Hub 105 may be any suitable device, including, but not limited to: a hub, a switch, a conventional router, and a wireless router.

Hub 105 is centrally connected to network devices 115, 125, and 135 via communication paths 110, 120, and 130, respectively. Communication paths 110, 120, and 130 may be any suitable combination of wired and wireless paths. For the purposes of the present invention, only wired paths will be discussed. Wired paths may use cables such as, for example, Category 2 unshielded twisted pair (UTP) cables, Category 3 UTP cables, Category 4 UTP cables, Category 5 UTP cables, fiber optic cables, coaxial cables, shielded twisted pair cables, or any other suitable cables.

Network devices may include, for example, desktop computers, notebook computers, workstations, servers, handheld computers, printers, computer peripherals, cable modems, DSL modems, ISDN modems, satellite receivers, and any other suitable devices.

Each network device includes or is coupled to a media access control (MAC) layer, which, in the case of a computer, may be provided by a network interface card (NIC). The MAC layer may include circuitry for controlling the flow of data packets to and from a physical layer (PHY), which may also be provided by the NIC. The PHY may include circuitry configured to interface with a medium, such as, for example, the Ethernet. The PHY may also be capable of performing auto-negotiation with link partners.

Preferably, hub 105 is capable of auto-negotiation because, as shown in FIG. 1, it is centrally connected to the other network devices. Network devices, such as network devices 115 and 125, may also be capable of auto-negotiation. Network devices that are not capable of auto-negotiation, such as network device 135, are referred to as legacy devices (i.e., legacy devices operate at a predetermined speed/mode). Auto-negotiation may be performed between two auto-negotiation-enabled network devices that are linked together (e.g., a computer and a hub). As will be shown below, any network device capable of auto-negotiation may be adapted to perform reverse auto-negotiation in accordance with the present invention.

The auto-negotiation process in an Ethernet-based local area network is defined in "IEEE Standards 802.3 (™)-2002" (especially subsections 28 and 40), which is hereby incorporated by reference herein in its entirety.

Generally, auto-negotiation is a handshaking and information-exchange process to determine the highest common operational mode of two network devices (i.e., a network device and the link partner). The PHY of the network device and the PHY of the link partner may transmit a series of fast link pulse bursts to each other several times to advertise their abilities, and acknowledge receipt and understanding of the common modes of operation that the PHYs share. Both the PHY and link partner may resolve their abilities to the highest common operational mode.

Figure 2:
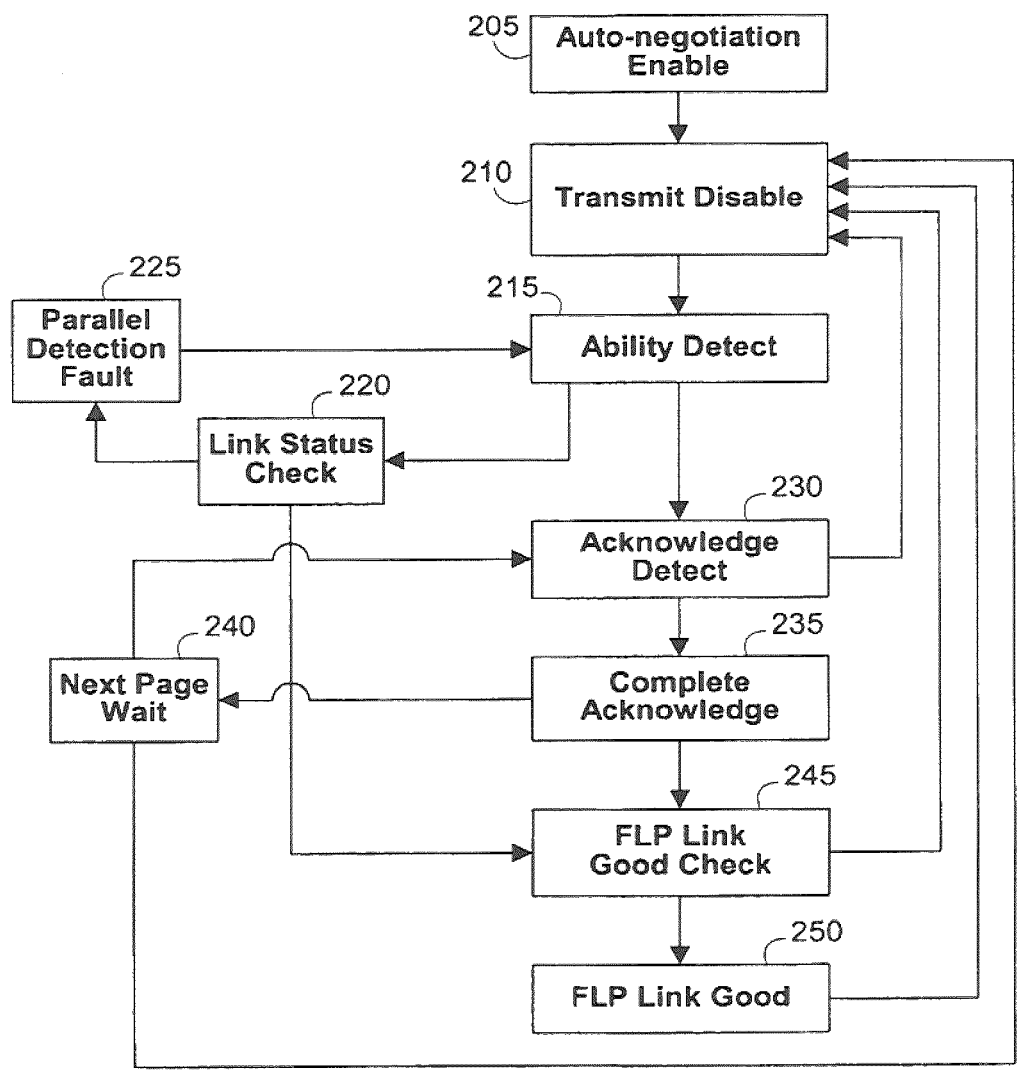
FIG. 2 is an illustrative state diagram for a state machine for performing conventional auto-negotiation in accordance with IEEE 802.3 Standards.

A simplified state machine 200 (conventional) for performing auto-negotiation in accordance with IEEE 802.3 standards is shown in FIG. 2. Illustrative auto-negotiation state machine 200 shows how a local PHY operates to perform auto-negotiation with another PHY (i.e., the link partner). Preferably, the link partner, if enabled for auto-negotiation, operates substantially in parallel with the local PHY in a separate state machine 200.

FIG. 2 shows several illustrative states that may be involved in performing auto-negotiation, including Auto-negotiation Enable state 205, Transmit Disable state 210, Ability Detect state 215, Link Status Check state 220, Parallel Detection Fault state 225, Acknowledge Detect state 230, Complete Acknowledge state 235, Next Page Wait state 240, FLP Link Good Check state 245, and FLP Link Good state 250. It should be noted that these states are merely illustrative and that they are provided to assist in illustrating auto-negotiation.

The local PHY enters state machine 200 at Auto-negotiation Enable state 205, in which the local PHY initializes itself for auto-negotiation with the link partner. From Auto-negotiation Enable state 205, the local PHY proceeds to Transmit Disable state 210. In Transmit Disable state 210, the local PHY will wait for a specified period of time, to prevent the link partner from establishing a link with the local PHY. The local PHY may also disable its own transmit functions during this period of time. Once the specified period of time has elapsed, the local PHY may enter Ability Detect state 215.

In Ability Detect state 215, the local PHY may determine whether the link partner is a legacy device using a parallel detection function. If the link partner is a legacy device, then the link partner is only enabled to communicate in a single mode (e.g., 10BASE-T) and therefore is not capable of auto-negotiation (e.g., network device 135 (FIG. 1)). If the local PHY determines that the link partner is a legacy device and the link device is ready to receive information, then the local PHY may proceed to Link Status Check state 220 to prepare to establish a link with the link partner. If a link cannot be established, link control is disabled in Parallel Detection Fault state 225 and the local PHY reenters Ability Detect state 215 to reattempt to establish a connection with the link partner. If a link is successfully established, then the local PHY may proceed to FLP Link Good Check state 245 and FLP Link Good state 250.

If the link partner is enabled for auto-negotiation, the local PHY and the link partner (in its corresponding Ability Detect state) will transmit several fast link pulse (FLP) bursts to one another. The bits transmitted within the FLP bursts become the basis of pages (i.e., sixteen bit words). The first page transmitted by a PHY may be referred to as a base page for the PHY. Several abilities of the local PHY are encoded within the base page. For example, 10BASE-T and 100BASE-TX abilities of the local PHY are mapped to four bits in the base page. When the local PHY receives, for example, three identical FLP bursts from the link partner (excluding the acknowledge bit), the local PHY may retransmit an FLP burst for the current page with the acknowledge bit set to a logic one and proceed to Acknowledge Detect state 230. Likewise, when the link partner receives, for example, three identical FLP bursts from the local PHY, the link partner may transmit a FLP burst for the current page with the acknowledge bit set to one.

In Acknowledge Detect state 230, the local PHY continues to receive FLP bursts from the link partner, in which the link partner transmits a FLP burst each time the link partner receives a FLP burst. When, for example, three consecutive FLP bursts having the acknowledge bit set to one are received by the local PHY, the local PHY may proceed to Complete Acknowledge state 235. Likewise, the link partner may proceed to the corresponding Complete Acknowledge state when three consecutive FLP bursts having the acknowledge bit set to one are received from the local PHY. However, if the data bits of the FLP bursts are not consistent with the bits of the FLP bursts received in Ability Detect state 215, the local PHY may return to Transmit Disable state 210 to attempt to restart the auto-negotiation process.

At the Complete Acknowledge state 235, the local PHY may determine whether the link partner intends to send a next page. One or more next pages after the base page may be transmitted by the link partner, for example, to advertise information regarding additional abilities of the link partner.

The next pages may be transmitted in a manner similar to transmitting the base page. For example, information regarding 1000BASE-T ability is encoded on a next page, therefore, a PHY with 1000BASE-T ability must transmit a next page to the link partner in order to advertise this ability. Next pages may also be used to transmit extended unformatted messages. If the local PHY receives a FLP burst from the link partner with the next page bit set to one or intends to send a next page of its own, the local PHY may proceed to Next Page Wait state 240. Otherwise, the local PHY may proceed to FLP Link Good Check state 245.

If the base page is the only page being transmitted (or when all next pages have been transmitted by the local PHY and the link partner), the local PHY may continue to FLP Link Good Check state 245 to enable link control for the highest common operational mode. The local PHY may employ a priority resolution function to determine the highest common operational mode, which assigns the highest priority to the fastest mode (e.g., 1000BASE-T) and the lowest priority to the slowest mode (e.g., 10BASE-T). The priority resolution function determines the highest mode at which both the local PHY and link partner are capable of operating. If link control for the highest common mode cannot be enabled, then the local PHY may return to Transmit Disable state 210. Otherwise, the local PHY may proceed to FLP Link Good state 250 to conclude the auto-negotiation process. The local PHY may remain in FLP Link Good state 250 until the link with the link partner is broken, whereupon the local PHY may reenter Transmit Disable state 210.

Performing auto-negotiation in the manner described above is effective for establishing a link between two network devices at the highest common operational mode (e.g., the highest speed connection). In some instances, high network performance may not be as important as, for example, low power consumption. It may be more beneficial from a power consumption point-of-view to establish a link at the lowest speed which is common to both devices. In some embodiments, it may be beneficial to establish a link at some other preferred common operational mode such as the common mode having the lowest power consumption. However, it may be detrimental to the overall network for the two network devices to link twice in order to connect at a preferred common operational mode. Reverse auto-negotiation may be performed to establish a connection between two network devices operating at a preferred common operational mode (e.g., lowest common speed or lowest common power consumption) without linking twice.

Figure 3:
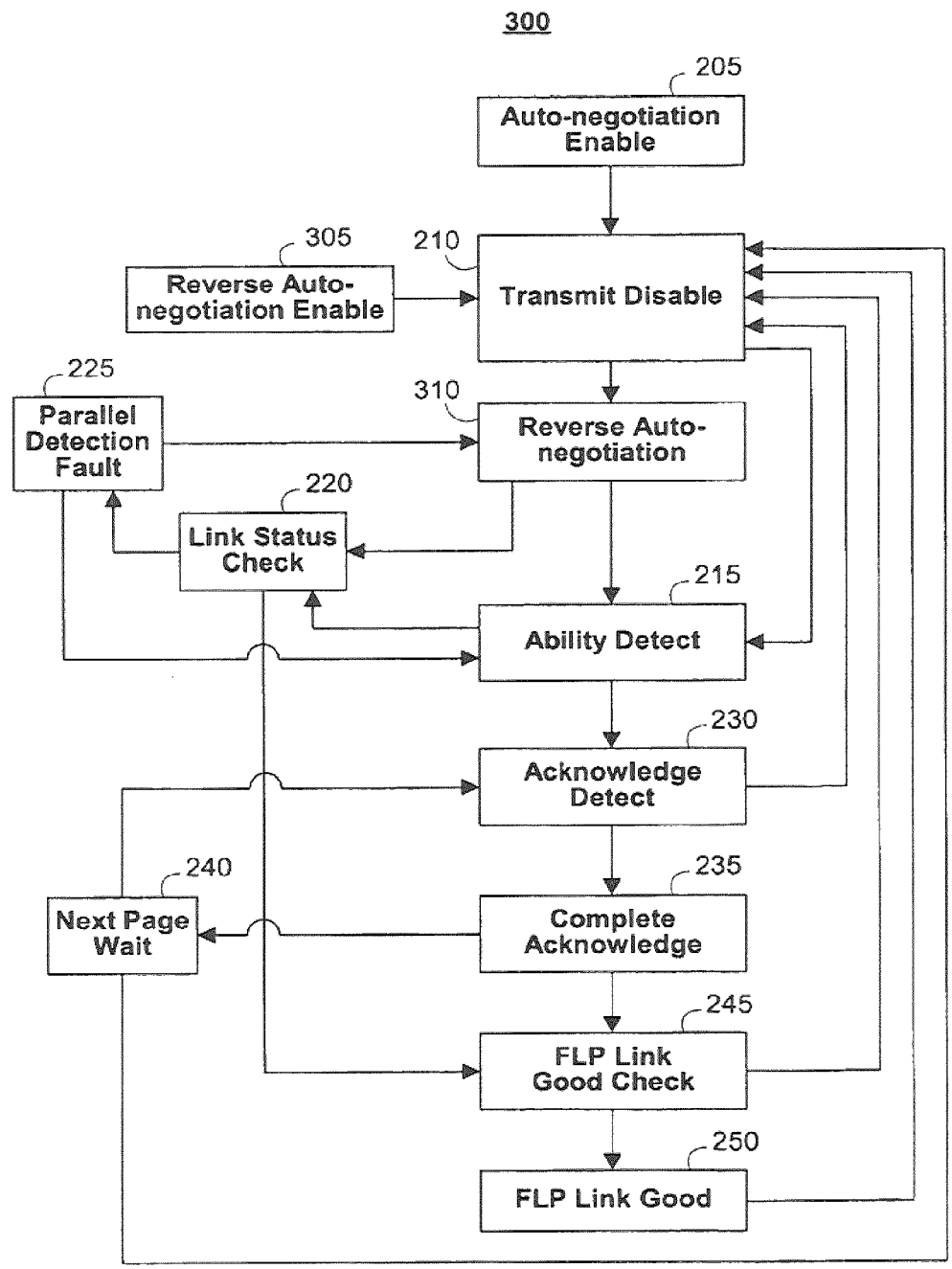
FIG. 3 is an illustrative state diagram for a state machine for performing reverse auto-negotiation in accordance with the present invention.

FIG. 3 shows an illustrative state machine 300 for performing reverse auto-negotiation in accordance with the invention. Reverse auto-negotiation allows two network devices to establish a connection at any preferred common operational mode. In some embodiments, reverse auto-negotiation allows two network devices to establish a connection at the lowest common operational mode. Reverse auto-negotiation may be performed by a local network device, the link partner, or both the local network device and the link partner. For example, a local PHY may operate according to reverse auto-negotiation state machine 300 and the PHY of the link partner may operate according to auto-negotiation state machine 200. In another example, if the link partner also intends to perform reverse auto-negotiation, the link partner may also operate according to reverse auto-negotiation state machine 300.

Generally, reverse auto-negotiation allows a local network device to stall the process of auto-negotiation with another network device (i.e., the link partner). This allows the local network device to receive the abilities of the link partner before transmitting its own abilities to the link partner as in a manner that would allow the link partner to fully proceed with normal auto-negotiation. Once the local network device receives the abilities of the link partner, the local network device only advertises a preferred common operational mode (e.g., the lowest common operational mode), which it may determine by examining the abilities of the link partner in relation to its own abilities.

In FIG. 3, two additional states, Reverse Auto-negotiation Enable state 305 and Reverse Auto-negotiation state 310, are provided in addition to the normal auto-negotiation states shown in FIG. 2. The local PHY may initiate reverse auto-negotiation with the link partner by entering state machine 300 at Reverse Auto-negotiation Enable state 305.

If the local PHY detects that the link partner is a legacy device, the local PHY proceeds to Link Status Check State 220. If the local PHY is able to establish a link with the link partner, the local PHY proceeds to FLP Link Good Check state 245. Otherwise, the local PHY proceeds to Parallel Detection Fault State 225 to disable link control. If the local PHY is performing reverse auto-negotiation, the local PHY returns to Reverse Auto-negotiation state 310. Otherwise the local PHY returns to Ability Detect state 215.

When the local PHY reaches Reverse Auto-negotiation state 310, the local PHY transmits a series of FLP bursts to the link partner. However, in reverse auto-negotiation, at least one of the bits (excluding the speed/duplex and acknowledge bits) of the series of FLP bursts is toggled such that this bit does not match for consecutive FLP bursts. Because the link partner expects to receive consecutive matching FLP bursts from the local PHY, toggling bits in the FLP bursts forces the link partner to remain in the corresponding Ability Detect state to continue to wait for matching FLP bursts from the local PHY. Preferably, more than one bit is toggled to ensure that bit error does not cause the link partner to erroneously recognize consecutive matching FLP bursts.

While the link partner is waiting for matching FLP bursts, it may transmit its own FLP bursts for the base page, in which its abilities are encoded. If the local PHY receives, for example, three FLP bursts from the link partner, and the speed/duplex bits of the FLP bursts match, then the local PHY may assume that the abilities of the link partner are accurately encoded in the FLP bursts.

The local PHY may not require all the bits of the FLP bursts of the link partner to match (excluding the acknowledge bit), as in normal auto-negotiation, because the link partner may also be performing reverse auto-negotiation and may be toggling the bits of its FLP bursts. Preferably, the link partner does not toggle the speed/duplex bits of the FLP bursts to allow the actual capabilities of the link partner to be received by the local PHY.

Once FLP bursts having consistent speed and duplex data have been received by the local PHY, the local PHY may then select the preferred common operational mode (e.g., the lowest common operational mode) and advertise only this ability in a series of FLP bursts to the link partner. Normal auto-negotiation may proceed from this point to set the operating mode of the link partner and the local PHY to the preferred common operational mode (e.g., both the local PHY and the link partner proceed to the Acknowledge Detect, FLP Link Good Check, and FLP Link Good states).

It should be noted that the local PHY may intentionally bypass Next Page Wait state 240 to streamline the reverse auto-negotiation process. For example, if the local PHY has 10BASE-T or 100BASE-T capabilities and also has 1000BASE-T capabilities (or higher), the local PHY may intentionally bypass Next Page Wait state 240 (which advertises 1000BASE-T capabilities) because 1000BASE-T is the highest performance mode available and this capability is not going to be advertised for reverse auto-negotiation.

The approach illustrated in state machine 300 also allows normal auto-negotiation to occur between the local PHY and the link partner, when desired. Normal auto-negotiation may proceed if the local PHY bypasses Reverse Auto-negotiation state 310 to Ability Detect State 215, whereupon it advertises all of its abilities to the link partner. In this case, the default priority resolution function may determine the highest common operational mode for both of the network devices.

There are some alternative approaches to performing reverse auto-negotiation in accordance with the present invention. In one alternative, after the local PHY receives the capabilities of the link partner, the local PHY may present itself as a legacy device capable of only the preferred common operational mode. This approach, however, may have some disadvantages. One disadvantage may be that the local PHY, posing as a legacy device, may only communicate with the link partner at half duplex. Another disadvantage may be that the local PHY will not be able to negotiate pause settings with the link partner.

Figure 4:
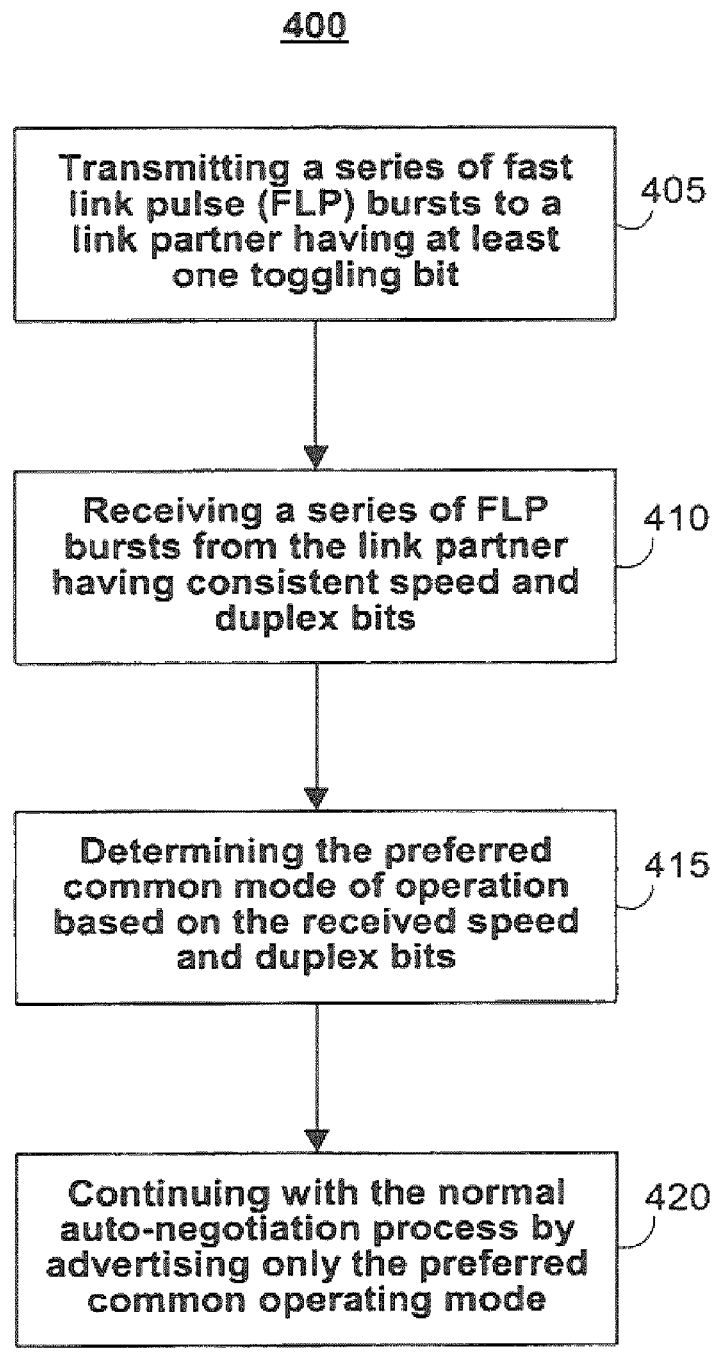
FIG. 4 is a simplified flow chart of an illustrative reverse auto-negotiation method in accordance with the present invention.

FIG. 4 is a flow diagram illustrating reverse auto-negotiation in accordance with the invention. At step 405, the local PHY transmits a series of FLP bursts to the link partner, of which consecutive FLP bursts do not completely match one another. Because the link partner is expecting to receive at least three consecutive matching FLP bursts, the link partner will not continue to the Acknowledge Detect state until three matching FLP bursts are received from the local PHY. For example, the local PHY may toggle bits (other than the speed/duplex and acknowledge bits) from one FLP burst to the next FLP burst.

At step 410, while the link partner continues to wait for three matching FLP bursts from the local PHY, the link partner transmits its own FLP bursts to the local PHY. If the local PHY receives three FLP bursts, in which the speed/duplex bits match, the local PHY may assume that the abilities of the link partner are accurately encoded in its FLP bursts.

At step 415, the local PHY determines the preferred common operating mode. For example, the local PHY receives 10BASE-T and 100BASE-T abilities of the link partner from the FLP bursts for the base page. The local PHY may use a modified priority resolution table, for example, in which the lowest common operating mode has the highest priority, to determine the preferred common operating mode.

At step 420, the local PHY may continue with the normal auto-negotiation process by advertising only the preferred common operating mode. The auto-negotiation protocol of the link partner will determine that the local PHY is only capable of operating at the preferred common operating mode.

Figure 5:
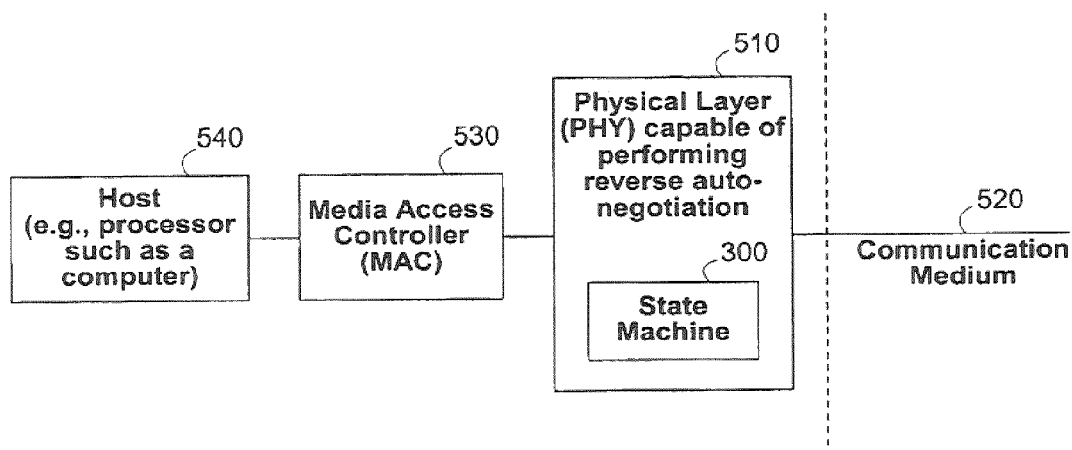
FIG. 5 is a simplified block diagram of an illustrative embodiment of circuit apparatus constructed in accordance with the invention.

Illustrative apparatus in accordance with the invention is shown in FIG. 5. This apparatus includes physical layer (PHY) circuitry 510 that is capable of performing reverse auto-negotiation in accordance with the invention. For example, PHY 510 may include circuitry capable of implementing state machine functions 300 like those shown in FIG. 3, and hence performing a sequence of operations like that illustrated by the flow diagram in FIG. 4. PHY 510 uses communication medium 520 to connect to a link partner (not shown in FIG. 5, but illustratively another instance of apparatus like that shown in FIG. 5) when communication with the link partner is desired. PHY 510 may serve as the communication link between media access controller (MAC) 530 and communication medium 520. For example, PHY 510 may be one of the components of MAC 530. MAC 530 may serve as a communication port for host circuitry 540 (e.g., a processor such as a computer). For example, MAC 530 may be on a network interface card (NIC) of computer 540, and the depicted connection between components 530 and 540 may be a PCI bus of computer 540.

Figure 6:
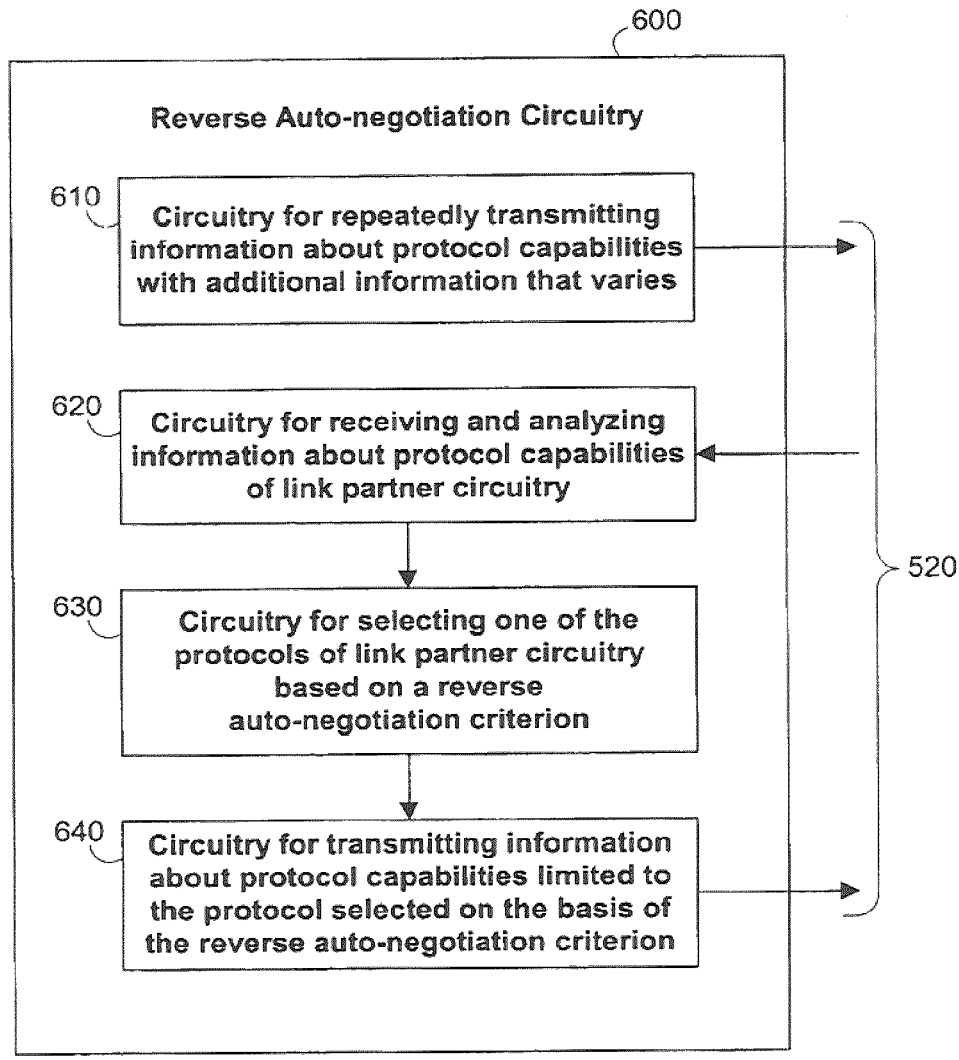
FIG. 6 is another simplified block diagram of circuit apparatus constructed in accordance with the invention.

An illustrative embodiment of reverse auto-negotiation circuitry 600 in accordance with the invention is shown in FIG. 6. For example, the circuitry shown in FIG. 6 may be implemented as part of PHY circuitry 510 in FIG. 5. Circuitry 600 includes circuitry 610 for repeatedly transmitting information about the communication protocol capabilities of the local circuitry. This information is transmitted with additional information that varies from one transmission to the next. This prevents the link partner circuitry that receives this information from proceeding to make a protocol selection based on the normal auto-negotiation criterion. Examples of the varying additional information are provided earlier in this specification.

Circuitry 600 further includes circuitry 620 for receiving the link partner's protocol information. Circuitry 620 preferably includes components for analyzing the received information, e.g., for reliability by making sure that the same information is received several times before further action is taken on it.

Circuitry 600 still further includes circuitry 630 for selecting a protocol offered by the link partner based on a reverse auto-negotiation criterion. The protocol thus selected by circuitry 630 will be a protocol that is also among the capabilities of the local circuitry. The reverse auto-negotiation criterion is typically different from the normal auto-negotiation criterion. As explained earlier in this specification, the normal auto-negotiation criterion is typically selection of the highest speed that the local circuitry and the link partner circuitry are both capable of. The reverse auto-negotiation criterion may be selection of the lowest speed or lowest power consuming protocol that the local circuitry and the link partner circuitry are both capable of (but any other reverse auto-negotiation criterion may be used instead if desired).

Circuitry 600 still further includes circuitry 640 for transmitting information about protocol capabilities of the local circuitry that is now limited to the protocol selected by circuitry 630. Transmission of this information (which is also typically done repeatedly) allows subsequent communication to be established between the local circuitry and the link partner on the basis of this protocol. For example, normal auto-negotiation operation of the link partner receiving this circuit 640 information may produce this result.

The foregoing is only illustrative of the principles of this invention and various modifications can be made by those skilled in the art without departing from the scope and spirit of the invention.

What is claimed is:

1. A method of selectively operating first circuitry that communicates with second circuitry so that auto-negotiation of a protocol for communication between the first and second circuitries is modified from basing protocol selection on a first criterion to basing protocol selection on a different second criterion comprising:
   transmitting information about the first circuitry's protocol capabilities to the second circuitry in a way that informs the second circuitry about the first circuitry's protocol capabilities without allowing the second circuitry to proceed to protocol selection based on the first criterion;
   using the second criterion to select a protocol offered by the second circuitry; and
   transmitting protocol capability information limited to the selected protocol offered by the second circuitry.

2. The method defined in claim 1 wherein the transmitting information about the first circuitry's protocol capabilities comprises:
   repeated transmission of the information about the first circuitry's protocol capabilities with additional information that varies from transmission to transmission.

3. The method defined in claim 1 wherein the using comprises:
   requiring repeated receipt of protocol information from the second circuitry prior to applying the second criterion to that information.

4. The method defined in claim 1 wherein the transmitting protocol capability information comprises:
   repeated transmission of the protocol capability information.

5. The method defined in claim 4 wherein the repeated transmission comprises:
   including in each transmission further information that is constant from transmission to transmission so that the second circuitry can proceed to the protocol selection based on the first criterion but limited to the protocol selected in the using step.

6. The method defined in claim 1 wherein the second criterion is lowest common speed.

7. The method defined in claim 1 wherein the second criterion is lowest common power consumption.

8. Communication circuitry comprising:
   first means for transmitting information about the communication circuitry's communication protocol capabilities in a way that informs link partner circuitry receiving that information about the communication circuitry's communication protocol capabilities without allowing the link partner circuitry to proceed to protocol selection based on an auto-negotiation criterion;
   second means for receiving communication protocol information transmitted by the link partner circuitry and for selecting a communication protocol from that information based on a reverse auto-negotiation criterion; and
   third means for transmitting communication protocol capability information limited to the selected communication protocol.

9. The communication circuitry defined in claim 8 wherein the first means comprises:
   fourth means for causing the information about the communication circuitry's communication protocol capabilities to be transmitted repeatedly with additional information that changes from one transmission to the next.

10. Physical layer circuitry comprising communication circuitry as defined in claim 8.

11. Media access controller circuitry comprising physical layer circuitry as defined in claim 10.

12. Communication system circuitry comprising:
   physical layer circuitry as defined in claim 10; and
   media access controller circuitry.

13. Communication system circuitry as defined in claim 12 further comprising:
   host circuitry.

14. The communication system circuitry defined in claim 13 wherein the host circuitry comprises:
   processor circuitry.

15. Communication circuitry comprising:
   transmitter circuitry to transmit information about the communication circuitry's communication protocol capabilities in a way that informs link partner circuitry receiving that information about the communication circuitry's communication protocol capabilities without allowing the link partner circuitry to proceed to protocol selection based on an auto-negotiation criterion;
   receiver circuitry to receive communication protocol information transmitted by the link partner circuitry and to select a communication protocol from that information based on a reverse auto-negotiation criterion; and
   further transmitter circuitry to transmit communication protocol capability information limited to the communication protocol selected by the receiver circuitry.

16. The communication circuitry defined in claim 15 wherein the transmitter circuitry comprises:
   transmitter circuitry to cause the information about the communication circuitry's communication protocol capabilities to be transmitted repeatedly with additional information that changes from one transmission to the next.

17. Physical layer circuitry comprising communication circuitry as defined in claim 15.

18. Media access controller circuitry comprising physical layer circuitry as defined in claim 17.

19. Communication system circuitry comprising:
   physical layer circuitry as defined in claim 17; and
   media access controller circuitry.

20. Communication system circuitry as defined in claim 19 further comprising:
   host circuitry.

21. The communication system circuitry defined in claim 20 wherein the host circuitry comprises:
   processor circuitry.

* * * * *